(12) United States Patent
Mukai et al.

(10) Patent No.: US 10,122,164 B2
(45) Date of Patent: Nov. 6, 2018

(54) PROTECTION DEVICE AND PROTECTION METHOD

(71) Applicant: Mitsubishi Electric Corporation, Tokyo (JP)

(72) Inventors: Takuya Mukai, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 435 days.

(21) Appl. No.: 14/787,009

(22) PCT Filed: May 14, 2013

(86) PCT No.: PCT/JP2013/063450
§ 371 (c)(1),
(2) Date: Oct. 26, 2015

(87) PCT Pub. No.: WO2014/184878
PCT Pub. Date: Nov. 20, 2014

(65) Prior Publication Data
US 2016/0105019 A1    Apr. 14, 2016

(51) Int. Cl.
*H02H 9/02* (2006.01)
*F24F 11/30* (2018.01)
*F24F 11/62* (2018.01)

(52) U.S. Cl.
CPC ............. *H02H 9/025* (2013.01); *F24F 11/30* (2018.01); *F24F 11/62* (2018.01); *F24F 2221/32* (2013.01)

(58) Field of Classification Search
CPC .... H02H 9/025; F24F 11/006; F24F 11/0086; F24F 2221/32
See application file for complete search history.

(56) References Cited

U.S. PATENT DOCUMENTS 5,196,980 A * 3/1993 Carson ..................... G01R 1/36
361/18
5,764,033 A    6/1998 Tamai
(Continued)

FOREIGN PATENT DOCUMENTS

EP     1 036 995 A1    9/2000
JP     S60-153315 U    10/1985
(Continued)

OTHER PUBLICATIONS

Office Action dated May 9, 2017 issued in corresponding JP patent application No. 2015-516801 (and partial English translation).
(Continued)

*Primary Examiner* — Scott Bauer
(74) *Attorney, Agent, or Firm* — Posz Law Group, PLC

(57) ABSTRACT

A current path of a first transistor is connected in series to a communication line. When the electric current through the current path of the first transistor becomes equal to or greater than a set electric current, a current-limiting controller limits the electric current through the current path by controlling the first transistor to increase the resistance of the current path. When the end-to-end voltage of the current path of the first transistor becomes equal to or greater than a set voltage, a load limiter switches the first transistor off.

10 Claims, 11 Drawing Sheets

(56) References Cited

U.S. PATENT DOCUMENTS

| | | | | |
|---|---|---|---|---|
| 6,529,355 B1* | 3/2003 | Becker | ............... | G01R 1/36 |
| | | | | 361/101 |
| 7,158,359 B2* | 1/2007 | Bertele | ............ | H03K 17/0822 |
| | | | | 361/93.7 |
| 8,526,149 B2* | 9/2013 | Cheng | ............... | H02H 9/025 |
| | | | | 361/58 |
| 2002/0125507 A1* | 9/2002 | Washburn | ........ | H01L 27/0705 |
| | | | | 257/213 |
| 2013/0325191 A1 | 12/2013 | Mukai et al. | | |

FOREIGN PATENT DOCUMENTS

| | | |
|---|---|---|
| JP | H09-062957 A | 3/1997 |
| JP | H09-266634 A | 10/1997 |
| JP | H11-193950 A | 7/1999 |
| JP | 2002-213803 A | 7/2002 |
| JP | 2002-305840 A | 10/2002 |
| JP | 2005-257256 A | 9/2005 |
| JP | 2009-097760 A | 5/2009 |
| WO | 2012/114421 A1 | 8/2012 |

OTHER PUBLICATIONS

Office Action dated Nov. 8, 2017 issued in corresponding CN patent application No. 201380076559.6 (and English translation).
International Search Report of the International Searching Authority dated Jun. 25, 2013 for the corresponding international application No. PCT/JP2013/063450 (and English translation).
Extended European Search Report dated Mar. 21, 2017 issued in corresponding EP patent application No. 13884489.9.
Office Action dated Sep. 27, 2016 issued in corresponding JP patent application No. 2015-516801 (and partial English translation).

\* cited by examiner

PROTECTION DEVICE AND PROTECTION METHOD

CROSS REFERENCE TO RELATED APPLICATION

This application is a U.S. national stage application of International Patent Application No. PCT/JP2013/063450 filed on May 14, 2013, the content of which is incorporated herein by reference.

TECHNICAL FIELD

The present disclosure relates to a protection device and a protection method.

BACKGROUND

In separate-type apparatuses (for example, air conditioning systems) in which an outdoor unit and an indoor unit are separated, in general the outdoor unit and the indoor unit are connected by the three connection lines of a power source line, a communication line and a common line (a line common for both power transmission and communication). The outdoor unit and the indoor unit receive a supply of power from an alternating current power source connected between the power source line and the common line.

In addition, the outdoor unit comprises a communication circuit in which a direct current power source that supplies several dozen volts of direct current voltage, a switching element and a receiving element are connected in series, and the indoor unit comprises a communication circuit in which a switching element and a receiving element are connected in series. The communication circuit installed in the outdoor unit and the communication circuit installed in the indoor unit form a closed circuit by being connected in parallel between the communication line and the common line. Furthermore, the outdoor unit and the indoor unit are able to control the loop current flowing in the closed circuit and communicate in both directions by switching the switching elements on and off.

The connection between the outdoor unit and the indoor unit is normally accomplished at the location where the outdoor unit and the indoor unit are located. Hence, erroneous connection of the connection line to the outdoor unit or the indoor unit can occur. When the alternating current power source is erroneously connected to both terminals (the input terminal and the output terminal) of the communication circuit operating at a lower voltage than the alternating current voltage supplied form the alternating current power source, the communication circuit can be destroyed by insufficient ability to withstand voltage (impressing of excess voltage) of the communication circuits of the outdoor unit and the indoor unit, or by excess current flowing in the outdoor unit or the indoor unit. Consequently, it is necessary to have, in the outdoor unit and the indoor unit, a protection means that protects the communication circuit from excess current or excess voltage.

An indoor air conditioning device utilizing a thermistor having a positive temperature coefficient is disclosed in Patent Literature 1 as a protection means. When an excess current flows in the communication line of this indoor air conditioning device, the excess current flows through the thermistor. Accompanying this, the thermistor generates heat and the resistance component of the thermistor increases, limiting the excess current.

In addition, a communication control device in which a current limiting circuit comprising a current-limiting bipolar transistor, a bipolar transistor for regulating base-emitter voltage and a current detection resistance is connected in series with a communication circuit is disclosed in Patent Literature 2. In this communication control device, the series circuit made up of the emitter-collector path of the current-limiting bipolar transistor maintained in a saturated state and the current detection resistance is connected to a communication circuit. The voltage (end-to-end voltage) of the current detection resistance increases accompanying increases in the electric current flowing in the communication circuit. When the voltage of the current detection resistance exceeds a prescribed voltage, the bipolar transistor for regulating base-emitter voltage regulates the base-emitter voltage of the current-limiting bipolar transistor and acts to keep the voltage (end-to-end voltage) of the current detection resistance constant. Because the upper limit of the current flowing in the communication circuit is limited by this action, the current limiting circuit can protect the communication circuit from eddy current.

PATENT LITERATURE

Patent Literature 1: Unexamined Japanese Patent Application Kokai Publication No. H11-193950.

Patent Literature 2: Unexamined Japanese Patent Application Kokai Publication No. 2009-97760.

The indoor conditioning device disclosed in Patent Literature 1 limits excess current by means of a thermistor having a positive temperature coefficient, as described above. Consequently, there is a possibility that excess current could flow through the communication circuit due to the lag in the action of the thermistor having a positive temperature coefficient.

The current limiting circuit disclosed in Patent Literature 2 realizes current limiting by causing the current-limiting transistor to operate in an active region. Hence, in order to protect the communication circuit from erroneous connection of the alternating current power source to the communication circuit, the current-limiting transistor needs to be a transistor that can withstand high voltage and has high collector dissipation. However, this kind of transistor in general has the problems of being slow in operating speed, expensive and large in size. In addition, there is also a problem in that circuit design that realizes sufficient heat discharge from the current-limiting transistor is necessary.

SUMMARY

In consideration of the foregoing, it is an objective of the present disclosure to provide a protection device and protection method with small action lag and lower costs.

In order to realize the above objective, the protection device for preventing an excess electric current from flowing in a communication line according to the present disclosure is provided in an air conditioning system, the air conditioning system including air conditioning units connected to each other by connection lines including a communication line, a power source line, and a common line. A first transistor includes a first current path connected in series with the communication line. A current-limiting controller limits an electric current flowing in the first current path by controlling the first transistor so that the resistance value of the first current path increases, when the electric current flowing in the first current path of the first transistor is equal to or greater than a set electric current.

With the present disclosure, it is possible to make action lag small and to lower costs.

DETAILED DESCRIPTION

Below, an air conditioning system 10 equipped with a protection device according to an exemplary embodiment of the present disclosure is described with reference to the drawings.

Figure 1:
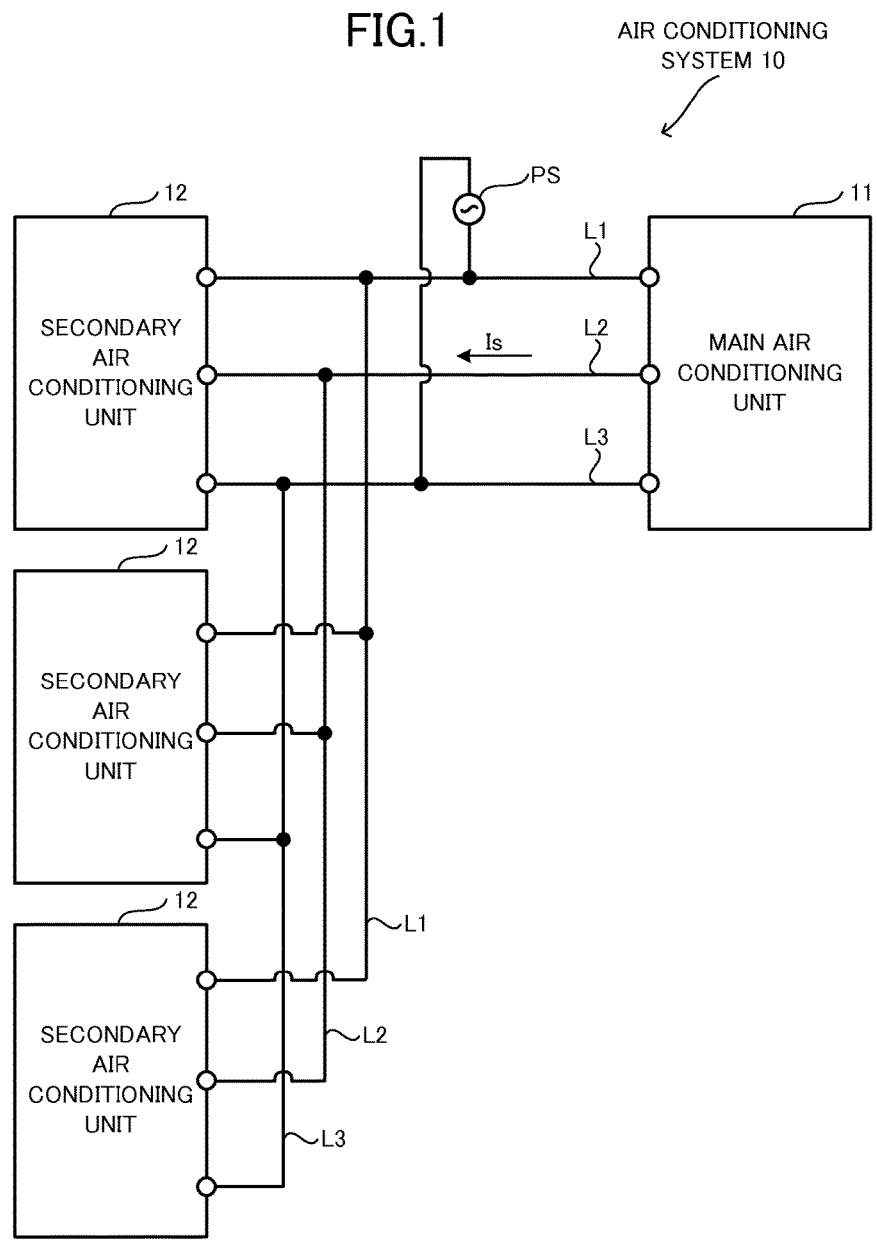
FIG. 1 is a composition diagram of an air conditioning system according to an exemplary embodiment of the present disclosure.

The air conditioning system 10 comprises one main air conditioning unit 11 and three secondary air conditioning units 12, as shown in FIG. 1.

The air conditioning system 10 controls the temperature inside a room that is a target of control, for example. The main air conditioning unit 11 is an outdoor unit, for example. The secondary air conditioning units 12 are indoor units, for example.

The main air conditioning unit 11 is connected to the secondary air conditioning units 12 by connection lines consisting of a power source line L1 that conveys electric power, a communication line L2 that conveys signals (passes electric current), and a common line (ground line) L3 that conveys both electric power and signals (conveys electric power and passes electric current).

The main air conditioning unit 11 and the secondary air conditioning units 12 act by means of alternating current voltage from a commercial power source PS impressed between the power source line L1 and the common line L3. Specifically, the main air conditioning unit 11 and the secondary air conditioning units 12 receive a supply of power from the commercial power source PS and cause air conditioning units such as a heat exchanger, an inverter circuit and/or the like to operate.

The main air conditioning unit 11 and the secondary air conditioning units 12 accomplish two-way communication via the communication line L2 and the common line L3. Specifically, the main air conditioning unit 11 and the secondary air conditioning units 12 accomplish two-way communication through serial signals (signals including air conditioning control information) generated by switching on (flowing) and off (not flowing) a signal current Is flowing in the communication line L2 and the common line L3. As described below, the signal current Is flowing in the communication line L2 flows only in the direction from the main air conditioning unit 11 to the secondary air conditioning units 12.

The main air conditioning unit 11 collects information about room temperature, humidity, set (target) temperature and/or the like, for example, and serially transmits control commands to the secondary air conditioning units 12, thereby controlling such.

(Composition of Main Air Conditioning Unit 11)

Figure 2:
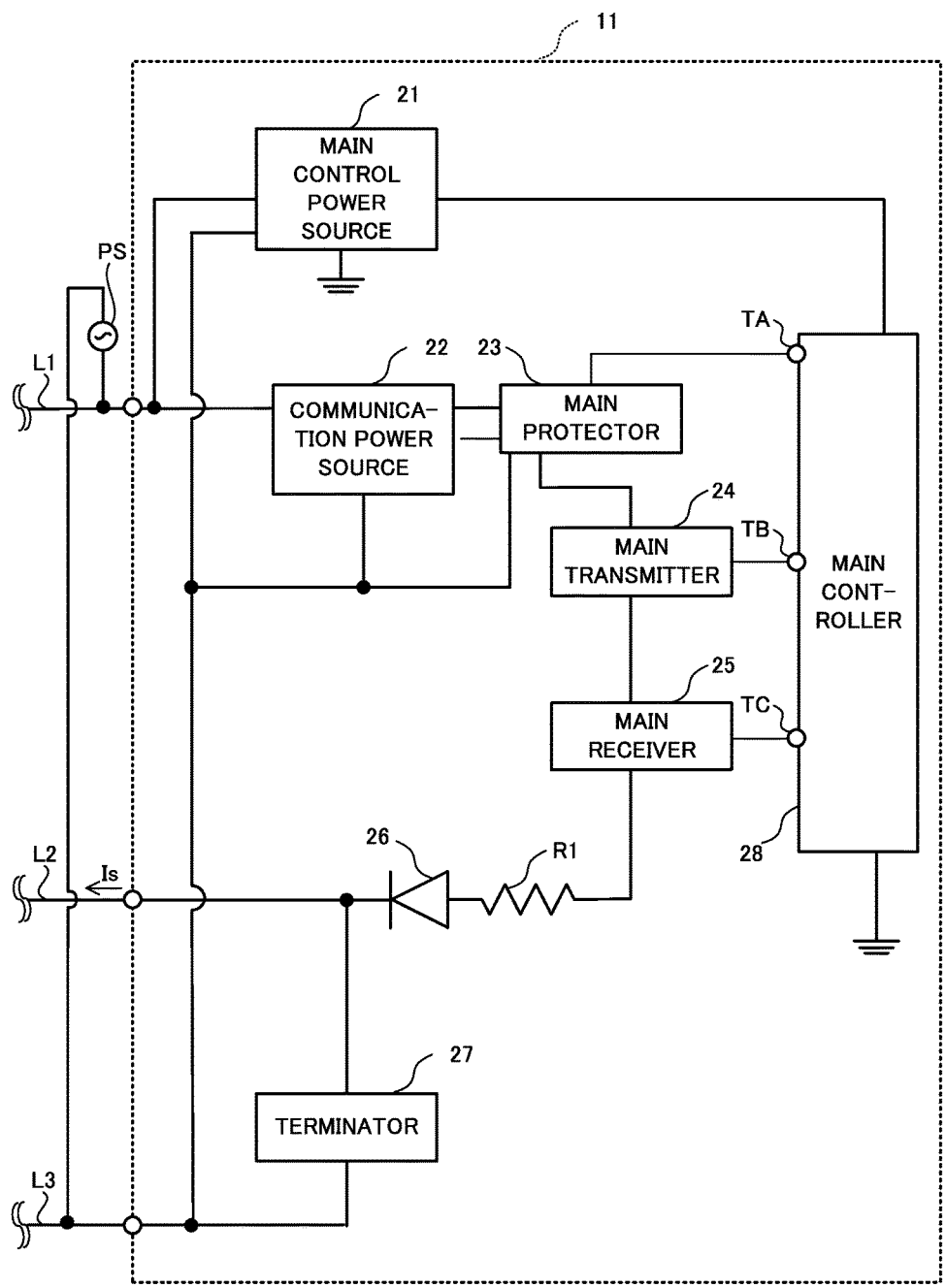
FIG. 2 is a block diagram of the main air conditioning unit shown in FIG. 1.

As shown in FIG. 2, the main air conditioning unit 11 comprises a main control power source 21, a communication power source 22, a main protector 23, a main transmitter 24, a main receiver 25, a resistor R1, a rectifier diode 26, a terminator 27 and a main controller 28. The main air conditioning unit 11 is provided with a normal composition for controlling air conditioning such as a heat exchanger and/or the like, for example, but here the sections related to the protection function and the communication function related to the present disclosure are primarily shown.

The main control power source 21 generates direct current voltage for causing the main controller 28 to operate, from alternating current voltage from the commercial power source PS impressed between the power source line L1 and the common line L3, and supplies this voltage to the main controller 28.

More specifically, one input terminal of the main control power source 21 is connected to the power source line L1 and the other input terminal is connected to the common line L3. The main control power source 21 receives the alternating current voltage impressed from the commercial power source PS connected between the power source line L1 and the common line L3 via both input terminals, generates direct current voltage through a transformer, rectifier circuit, smoothing circuit and/or the like, and outputs the direct current voltage between a ground terminal and an output terminal connected to the main controller 28. When a transformer is used, it is preferable to use an insulated transformer in which the power source side and the load side can be insulated.

The communication power source 22 generates a communication voltage (for example, a 24-volt direct current voltage) for forming a signal current Is for serial communication, from alternating current voltage supplied from the commercial power source PS.

Figure 3:
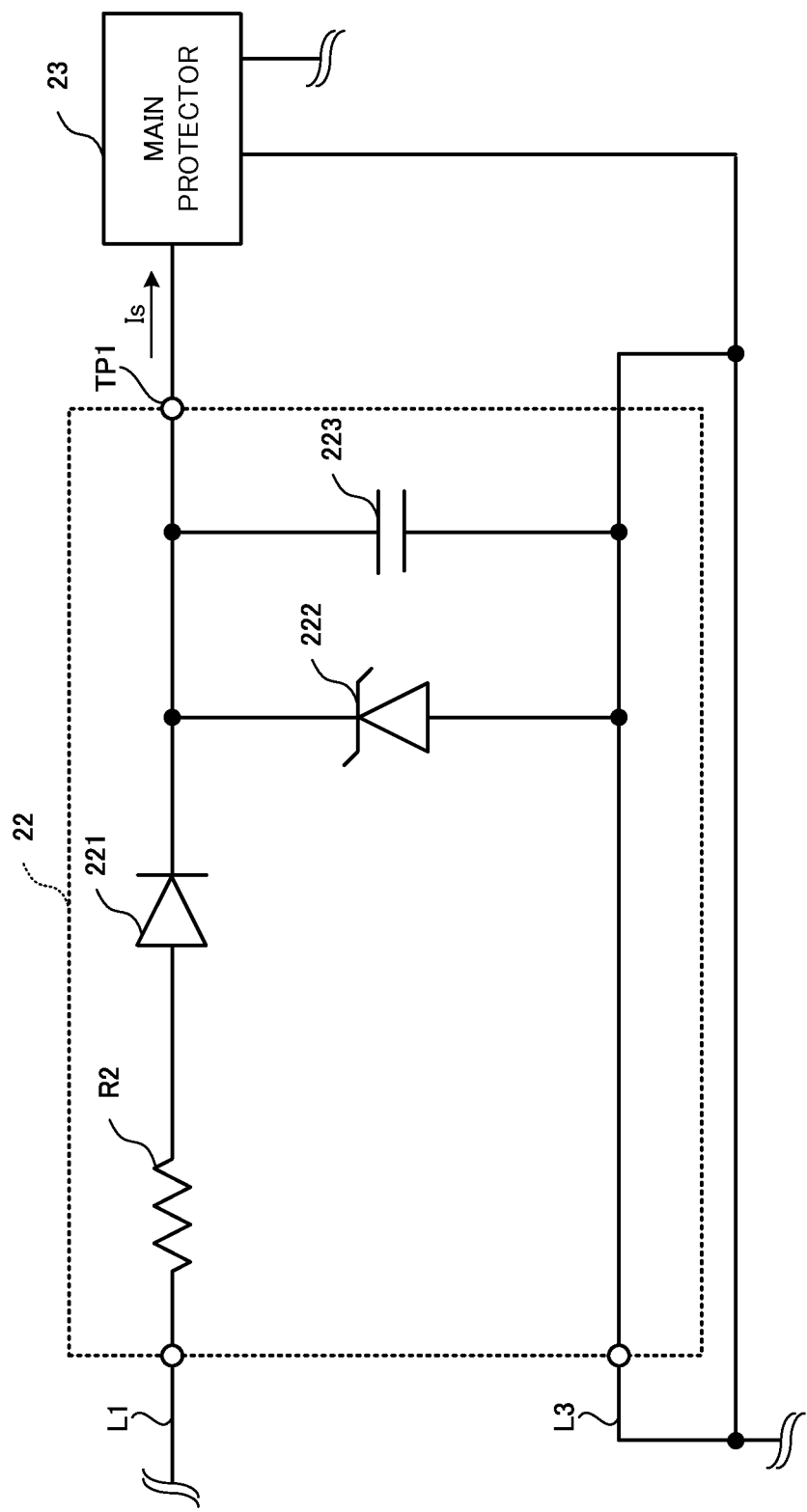
FIG. 3 is a circuit diagram of the communication power source shown in FIG. 2.

The communication power source 22 is composed of a half-wave rectifier circuit comprising a resistor R2, a rectifier diode 221, a Zener diode 222 and a capacitor 223, for example, as shown in FIG. 3.

One end of the resistor R2 is connected to the power source line L1 via one of the input terminals of the communication power source 22, and the other end of the resistor R2 is connected to the anode of the rectifier diode 221. The cathode of the rectifier diode 221 is connected to the cathode of the Zener diode 222, one end of the capacitor 223 and a terminal TP1.

The anode of the Zener diode 222 and the other end of the capacitor 223 are connected to the common line L3 via the other input terminal of the communication power source 22.

The resistor R2 and the rectifier diode 221 accomplish half-wave rectification on the alternating current voltage supplied from the commercial power source PS via the power source line L1 and the common line L3.

The Zener diode 222 clips the rectified half-wave voltage to the communication voltage. The capacitor 223 smoothes the half-wave clipped to the communication voltage. The sustained voltage (communication voltage) of the capacitor 223 is output between the main protector 23 and the common line L3 via the terminal TP1.

The main protector 23 shown in FIG. 2 prevents excess current from flowing in the communication line L2 and flowing in the communication circuit composed of the main transmitter 24 and the main receiver 25, when the commercial power source PS is erroneously connected between the communication line L2 and the common line L3. In addition, the protector 23 protects the communication circuit (the main transmitter 24 and the main receiver 25) from excess voltage when the commercial power source PS is erroneously connected between the communication line L2 and the common line L3.

Figure 4:
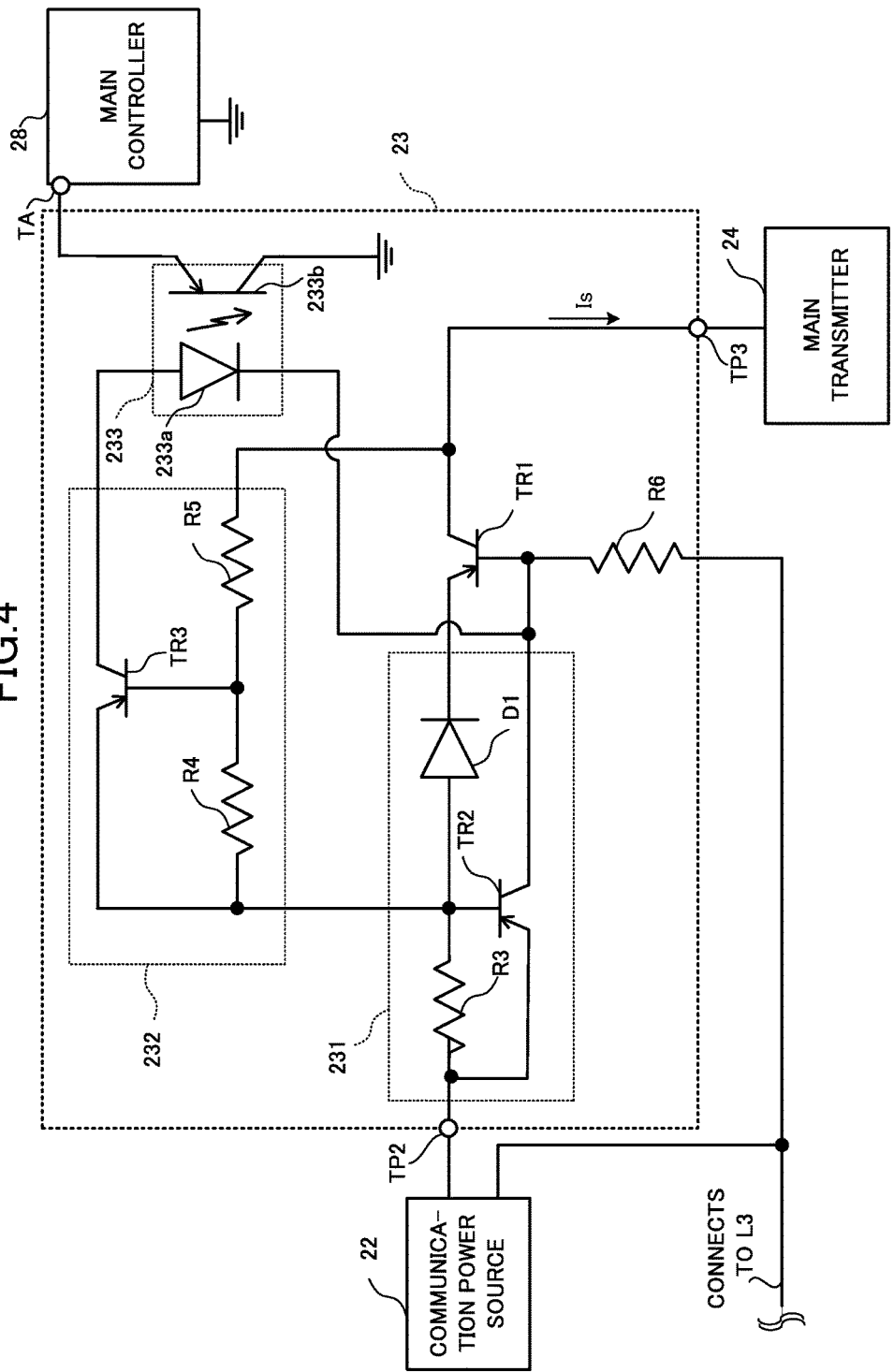
FIG. 4 is a circuit diagram of the main protector shown in FIG. 2.

The main protector 23 comprises a current-limiting controller 231, a load limiter 232, an erroneous connection detector 233 and a resistor R6, as shown in FIG. 4.

The current-limiting controller 231 is used to limit the maximum value of the signal current Is flowing in the communication line L2 and the common line L3 (signal current Is flowing in the communication circuit), and comprises a resistor R3, a PNP transistor TR2 and a rectifier diode D1.

In addition, a PNP transistor TR1 connected to the rectifier diode D1 is such that the emitter-collector path (current path) is connected in series with the communication line L2.

One end of the resistor R3 and the emitter of the transistor TR1 are connected to the terminal TP1 (output terminal) of the communication power source 22 via the terminal TP2. The other end of the resistor R3 and the base of the transistor TR1 are connected to the anode of the rectifier diode D1 and the load limiter 232.

The cathode of the rectifier diode D1 is connected to the emitter of the transistor TR2. The collector of the transistor TR2 is connected to the main transmitter 24 via the terminal TP3.

The base of the transistor TR2, the collector of the transistor TR1 and the erroneous connection detector 233 are connected to one end of the resistor R6. The other end of the resistor R6 is connected to the common line L3.

When the commercial power source PS is connected between the power source line L1 and the common line L3, the communication voltage is output from the terminal TP2 of the communication power source 22. As is described later, in this state when the main transmitter 24 is turned on, the signal current Is flows from the communication power source 22, via the terminal TP2, the resistor R3, the rectifier diode D1, the emitter-collector path (current path) of the transistor TR1 and the terminal TP3, to the main transmitter 24. This state is the normal state.

On the other hand, when the signal current Is increases due to some cause (for example, when the commercial power source PS is erroneously connected between the communication line L2 and the common line L3, and/or the like), the drop in voltage across the resistor R3 increases accompanying that increase. At this time, the transistor TR2 accomplishes regulation of the voltage between the base and emitter of the transistor TR1 by causing the collector-emitter voltage of the transistor TR2 to change, so that the end-to-end voltage of the resistor R3 maintains an equilibrium status with the on voltage of the base-emitter voltage of the transistor TR2. Consequently, it is possible to limit the upper limit of the signal current Is flowing to the main transmitter 24.

While the current-limiting controller 231 is limiting the upper limit of the signal current Is, the transistor TR1 is operating in the active region, so the collector-emitter voltage of the transistor TR1 is higher than the case in which the transistor TR1 is operating in the saturation region. Furthermore, collector dissipation corresponding to the integrated value of the collector-emitter voltage of the transistor TR1 and the collector current (signal current Is) of the transistor TR1 is generated in the transistor TR1. When a high voltage, such as the alternating current voltage supplied from the commercial power source PS, is impressed between the communication line L2 and the common line L3, the collector dissipation generated in the transistor TR1 becomes extremely large. Consequently, an expensive product large in size, which can withstand high voltages and has high permitted collector dissipation, is sought for the transistor TR1.

In order to resolve this problem, the load limiter 232 is provided in the main protector 23. The load limiter 232 controls the collector dissipation of the transistor TR1 by turning the transistor TR1 off when the emitter-collector voltage of the transistor TR1 becomes equal to or greater than a set value.

In this exemplary embodiment, the load limiter 232 turned the transistor TR1 off when the emitter-collector voltage of the transistor TR1 becomes equal to or greater than a set value, but this is intended to be illustrative and not limiting, for it would be fine, for example, for the transistor TR1 to be turned off when the voltage between the terminal TP2 and the terminal TP3 becomes equal to or greater than a reference value, and when the emitter-collector voltage of the transistor TR1 becomes equal to or greater than a set value. In addition, the load limiter 232 may turn the transistor TR1 off when, for example, the voltage between the terminal TP4 and the terminal TP7 becomes equal to or greater than a reference value and the emitter-collector voltage of the transistor TR1 becomes equal to or greater than a set value.

The load limiter 232 comprises a PNP transistor TR3 and resistors R4 and R5. The transistor TR3 controls the collector dissipation of the transistor TR1 by accomplishing excess voltage detection of the end-to-end voltage of the series resistance of the resistor R4 and the resistor R5.

One end of the resistor R4 is connected to the emitter of the transistor TR3, the other end of the resistor R3, the base of the transistor TR2 and the anode of the rectifier diode D1. The other end of the resistor R4 is connected to the base of the transistor TR3 and one end of the resistor R5. The other end of the resistor R5 is connected to the collector of the transistor TR1. In addition, the collector of the transistor TR3 is connected to the erroneous connection detector 233.

A voltage that is the sum of the forward voltage of the rectifier diode D1 and the collector-emitter voltage of the transistor TR1 is impressed on the series resistance of the resistor R4 and the resistor R5.

In this circuit, when the current-limiting controller 231 limits the upper limit of the signal current Is, the end-to-end voltage of the series resistance of the resistor R4 and the resistor R5 rises. Furthermore, when the end-to-end voltage of the resistor R4, which is a partial voltage of this end-to-end voltage, exceeds the on voltage (around 0.6 V) between the base and emitter of the transistor TR3, the transistor TR3 turns on and the emitter-collector thereof becomes conductive.

Through this, the base-emitter voltage of the transistor TR1 falls, the transistor TR1 becomes in an interrupted state and the collector current (the signal current Is) of the transistor TR1 is interrupted. Through this, the permitted collector dissipation of the transistor TR1 can be controlled in comparison to cases in which the load limiter 232 is not provided. Hence, it is possible to use an inexpensive transistor with low permitted collector dissipation as the transistor TR1.

The erroneous connection detector 233 detects the collector current of the transistor TR3 flowing when the end-to-end voltage of the series resistance of the resistor R4 and the resistor R5 is equal to or greater than a set value, and conveys a detection signal (a signal indicating that the commercial power source PS has been erroneously connected) to the main controller 28. Through this, the main controller 28 can be notified that excess voltage is impressed on the communication circuit (the main transmitter 24 and the main receiver 25) because of erroneous connection.

The erroneous connection detector 233 comprises a photocoupler comprising a photodiode 233a and a phototransistor 233b. The anode of the photodiode 233a is connected to the collector of the transistor TR3, and the cathode is connected to the collector of the transistor TR2, the base of the transistor TR1 and one end of the resistor R6.

On the other hand, the phototransistor 233b has one end of the current path connected to the terminal TA of the main controller 28 and the other end of the current path grounded.

As described above, when the end-to-end voltage of the resistor R4 exceeds the on voltage between the base and the emitter of the transistor TR3, the emitter-collector of the transistor TR3 becomes conductive. At this time, the current flowing in the emitter-collector path of the transistor TR3 flows through the photodiode 233a and causes the photodiode 233a to light up.

Through this, the phototransistor 233b turns on and the emitter-collector path is caused to become conductive. Consequently, the terminal TA of the main controller 28 is grounded. Through this, the main controller 28 detects that the commercial power source PS was erroneously connected.

The main transmitter 24 shown in FIG. 2 switches the signal current Is between on (flowing) and off (not flowing) in response to a voltage signal output from the terminal TB of the main controller 28.

Figure 5:
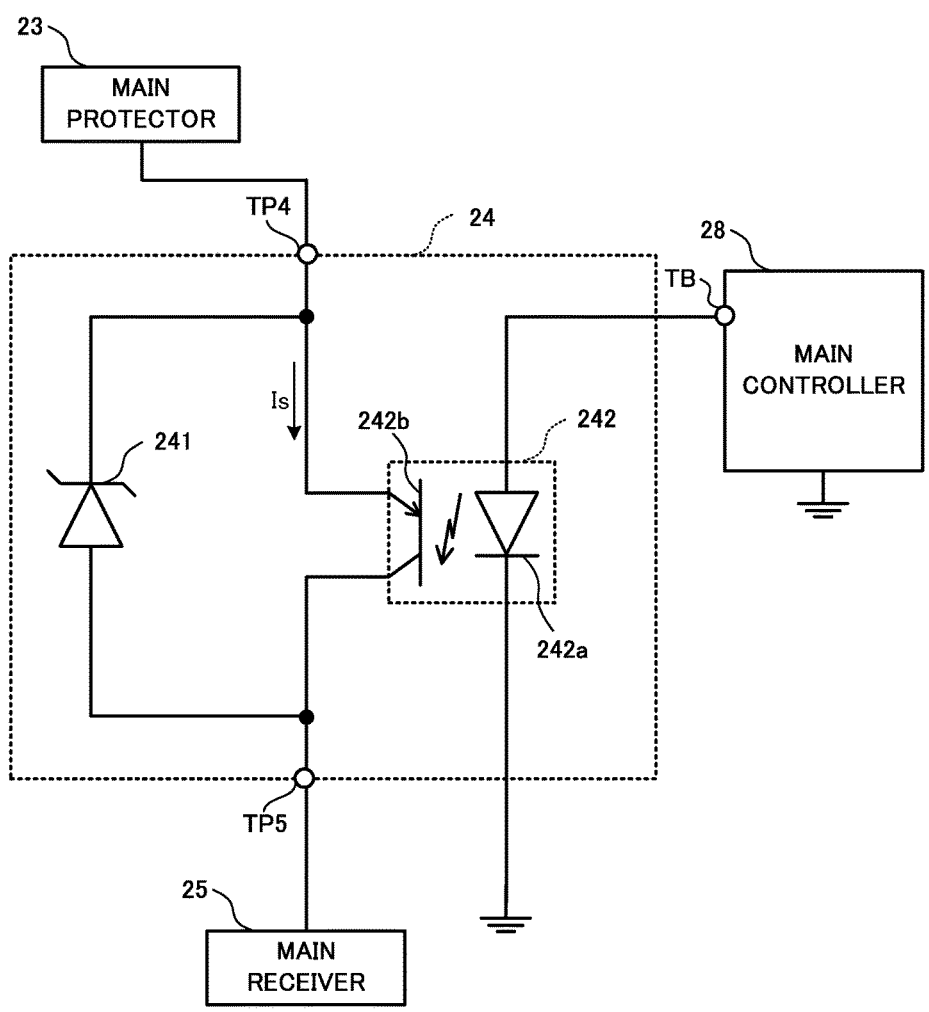
FIG. 5 is a circuit diagram of the main transmitter shown in FIG. 2.

The main transmitter 24 comprises a Zener diode 241 and a photocoupler 242, as shown in FIG. 5.

The cathode of the Zener diode 241 is connected to the main protector 23 and one end of the current path of the phototransistor 242b of the photocoupler 242. The anode of the Zener diode 241 is connected to the other end of the current path of the phototransistor 242b and the main receiver 25.

The anode of the photodiode 242a is connected to the terminal TB of the main controller 28, and the cathode of the photodiode 242a is grounded.

When the main controller 28 sets the voltage signal at the terminal TB to a high level, current flows in the photodiode 242a. Through this, the photodiode 242a emits light.

Through the light from the photodiode 242a, the phototransistor 242b becomes in a conducting state. Consequently, the signal current Is flows from the communication power source 22, via the main protector 23, the terminal TP4, the phototransistor 242b, the terminal TP5 and the main receiver 25, to the communication line L2.

In addition, when the main controller 28 sets the voltage signal at the terminal 1B to a low level, current no longer flows in the photodiode 242a. Consequently, the phototransistor 242b turns off and the signal current Is is interrupted.

In this manner, the main controller 28 can generate the signal current Is by controlling the voltage signal at the terminal TB.

In addition, when a large voltage is impressed on the communication circuit (the main transmitter 24 and the main receiver 25) such as when the commercial power source PS is erroneously connected between the communication line L2 and the common line L3, and/or the like, if the phototransistor 242b is in an interrupt state, excess voltage is impressed on the phototransistor 242b and the phototransistor 242b fails. In order to prevent this, protection for the phototransistor 242b to withstand voltage is realized by connecting the Zener diode 241 in parallel with the phototransistor 242b. In addition, besides this it would be fine to not use the Zener diode 241 but to use a phototransistor that can withstand a high collector voltage as the phototransistor 242b.

The main receiver 25 shown in FIG. 2 generates a received signal by detecting the absence or presence of the signal current Is, and conveys this signal to the main controller 28.

Figure 6:
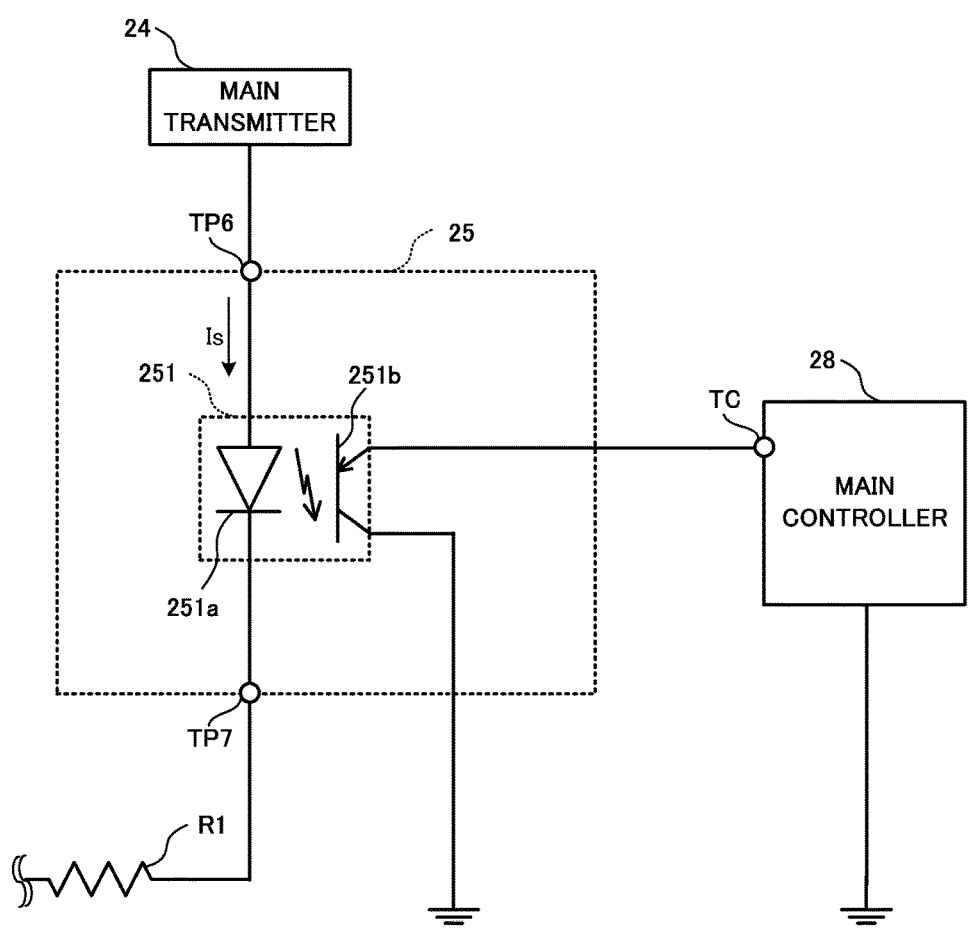
FIG. 6 is a circuit diagram of the main receiver shown in FIG. 2.

The main receiver 25 comprises, for example, a photocoupler 251 as shown in FIG. 6. The anode of a photodiode 251a comprising the photocoupler 251 is connected to the main transmitter 24 via the terminal TP6, and the cathode is connected to one end of the resistor R1 via the terminal TP7.

One end of the current path of a phototransistor 251b is connected to a terminal TC of the main controller 28, and the other end of the current path is grounded. The terminal TC of the main controller 28 is pulled up.

When the signal current Is flows to the photodiode 251a, the photodiode 251a emits light, causing the phototransistor 251b to turn on. Through this, the current path of the phototransistor 251b becomes conducting and a low-level received signal is generated.

On the other hand, when the signal current Is does not flow, the photodiode 251a is extinguished and the phototransistor 251b turns off. Through this, a high-level received signal is generated.

The resistor R1 shown in FIG. 2 is a limiting resistor that determines the maximum value of the signal current Is along with the resistor R7 of the secondary air conditioning unit 12. One end of the resistor R1 is connected to the terminal TP7 of the main receiver 25. The other end of the resistor R1 is connected to the anode of the rectifier diode 26.

The rectifier diode 26 interrupts reverse current flowing from the communication line L2 to the resistor R1.

The terminator 27 comprises a capacitor and/or the like, reduces the impedance between the communication line L2 and the common line L3 and causes the noise component on the communication line L2 to flow to the common line L3. Through this, it is possible to suppress overlaying of induction noise and/or the like on the signal current Is and to stabilize the signal current Is.

The main controller 28 comprises a processor and/or the like that operates by means of an operation power source supplied from the main control power source 21, and accomplishes control of the normal air conditioning operation of the main air conditioning unit 11. In addition, the main controller 28 accomplishes sending and receiving of serial signals using the signal current Is, among the secondary air conditioning units 12.

In addition, the main controller 28 executes a control process based on the detected signal of the erroneous connection detector 233. The main controller 28 causes a lamp provided in the main air conditioning unit 11 to light up, for example when the detection signal is received. Through this, an installer who installs the main air conditioning unit 11 can understand that the commercial power source PS is erroneously connected.

(Composition of Secondary Air Conditioning Units 12)

Next, the composition of the secondary air conditioning units 12 shown in FIG. 1 is explained. Each secondary air conditioning unit 12 comprises a secondary control power source 31, rectifier diodes 32 and 36, a resistor R7, a secondary receiver 33, a secondary transmitter 34, a secondary protector 35 and a secondary controller 37. Each secondary air conditioning unit 12 is provided with a normal composition for controlling air conditioning, but here the sections related to the protection function and the communication function related to the present disclosure are primarily shown.

The secondary control power source 31 generates a direct current voltage for causing the secondary controller 37 to operate, from the alternating current voltage from the commercial power source PS impressed between the power source line L1 and the common line L3, and supplies the direct current voltage to the secondary controller 37.

More specifically, one input terminal of the secondary control power source 31 is connected to the power source line L1, and the other input terminal is connected to the common line L3. The secondary control power source 31 receives, via the two input terminals, the alternating current voltage impressed from the commercial power source PS connected between the power source line L1 and the commonality L3, generates a direct current voltage by means of a transformer, a rectifier circuit, a smoothing circuit and/or the like, and outputs the generated voltage between the ground terminal and an output terminal connected to the secondary controller 37. When a transformer is used, it is preferable to use an insulated transformer in which the power source side and the load side can be insulated.

The rectifier diodes 32 and 36 protect the secondary receiver 33 and the secondary transmitter 34 from reverse voltage.

The anode of the rectifier diode 32 is connected to the communication line L2, and the cathode of the rectifier diode 32 is connected to one end of the resistor R7, the cathode of the rectifier diode 36 and a terminal SP6 of the secondary protector 35. The anode of the rectifier diode 36 is connected to the common line L3 and a terminal SP7 of the secondary protector 35.

The resistor R7 determines the size of the signal current Is. One end of the resistor R7 is connected to the cathodes of the rectifier diodes 32 and 36 and the terminal SP6 of the secondary protector 35. The other end of the resistor R7 is connected to the secondary receiver 33.

The secondary receiver 33 generates a reception signal by detecting the absence or presence of the signal current Is and conveys this reception signal to the secondary controller 37. In the case of the secondary receiver 33 using a photocoupler 331 shown in FIG. 8, the secondary receiver 33 outputs to the secondary controller 37 a low-level reception signal if the signal current Is is flowing to the photocoupler 331, and a high-level reception signal if the signal current Is is not flowing to the photocoupler 331.

Figure 8:
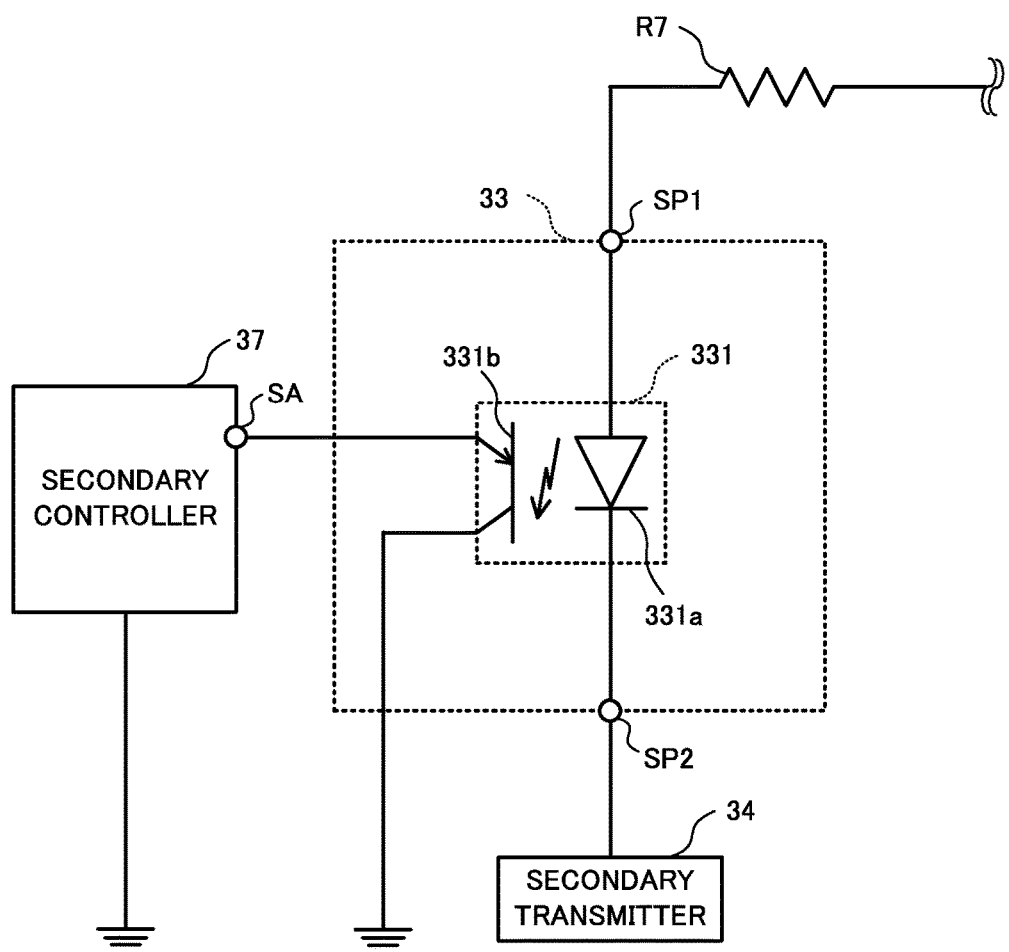
FIG. 8 is a circuit diagram of a secondary receiver shown in FIG. 7.

The secondary receiver 33 comprises the photocoupler 331, for example, as shown in FIG. 8. The anode of a photodiode 331a that makes up the photocoupler 331 is connected to the other end of the resistor R7 via a terminal SP1, and the cathode is connected to the secondary transmitter 34 via a terminal SP2.

One end of the current path of a phototransistor 331b is connected to a terminal SA of the secondary controller 37, and the other end of the current path is grounded.

Figure 7:
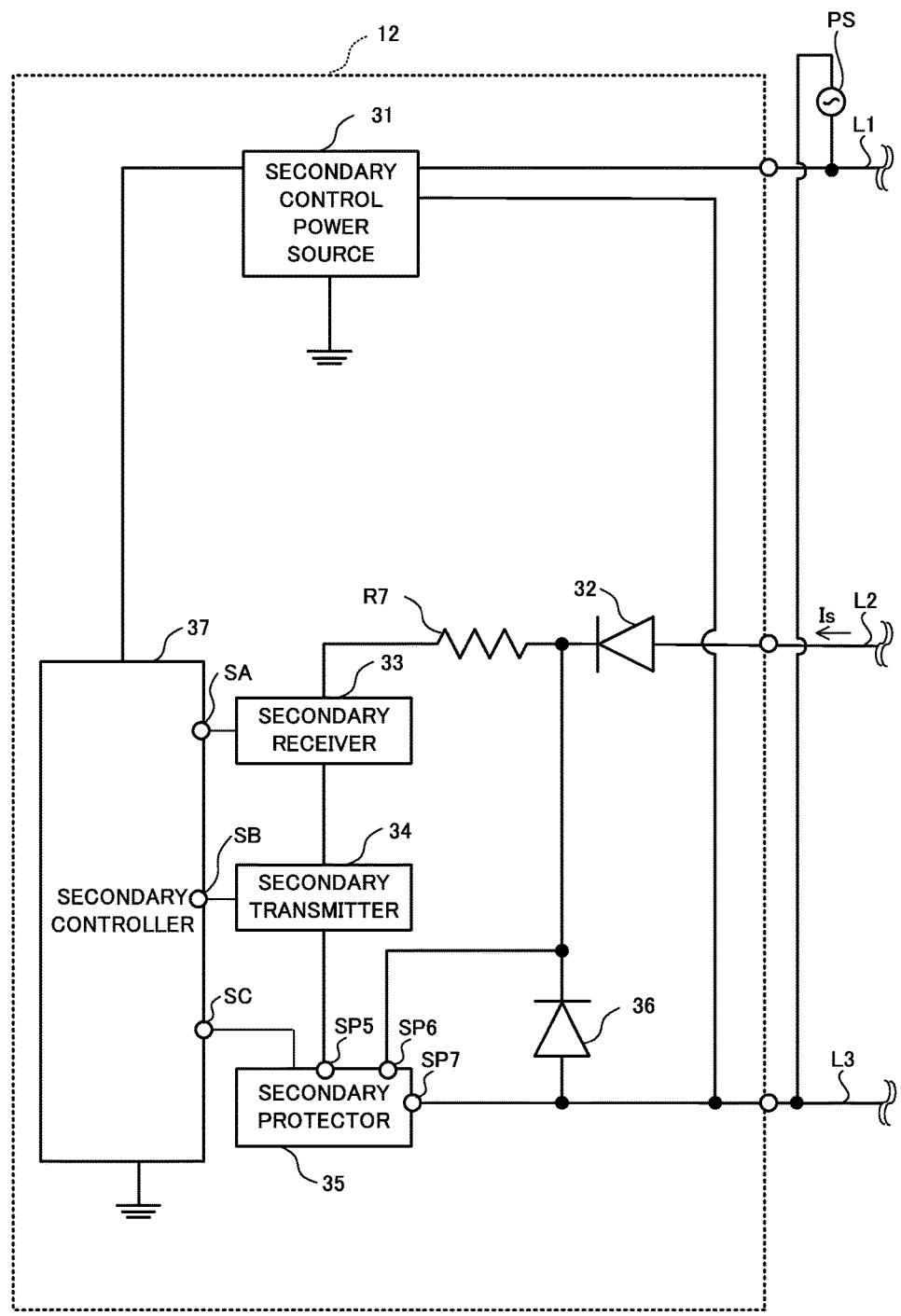
FIG. 7 is a block diagram of a secondary air conditioning unit shown in FIG. 1.

The secondary transmitter 34 shown in FIG. 7 switches the signal current Is flowing in the communication line L2 on (flowing) and off (not flowing) on the basis of the serial signal output by the secondary controller 37 via a terminal SB.

Figure 9:
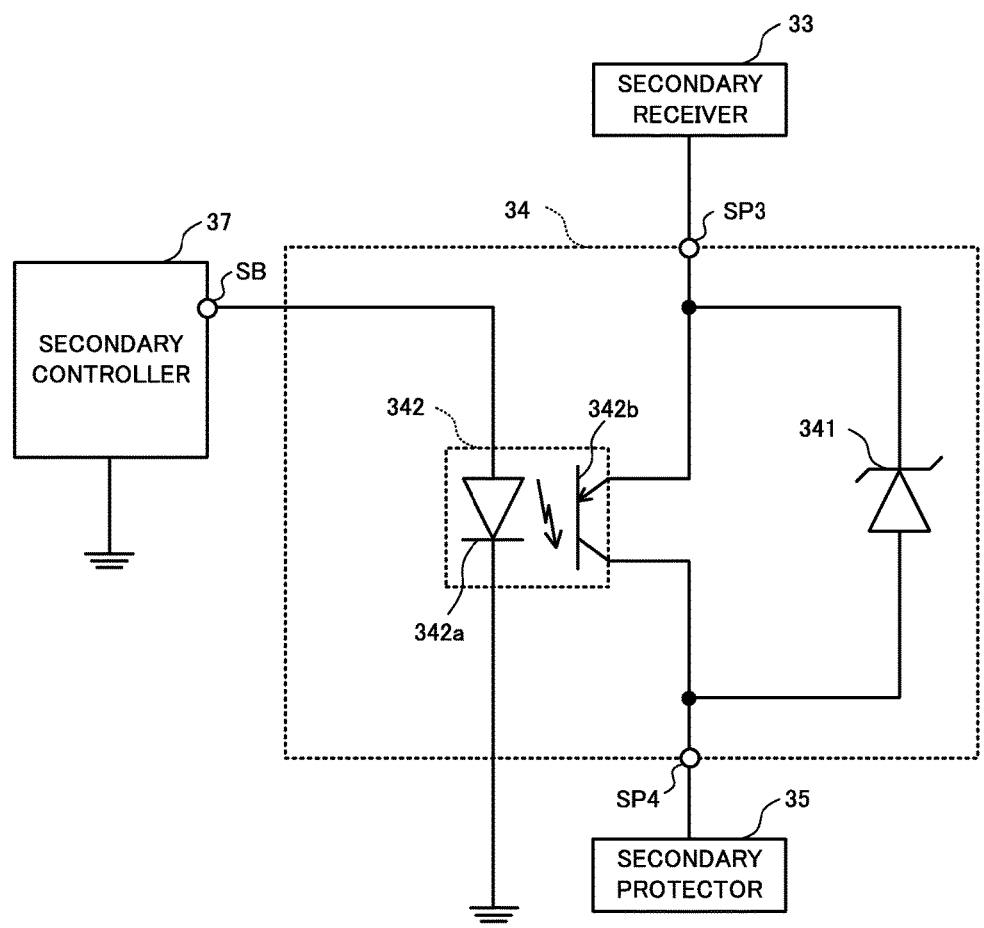
FIG. 9 is a circuit diagram of the secondary transmitter shown in FIG. 7.

The secondary transmitter 34 comprises a Zener diode 341, and a photocoupler 342, as shown in FIG. 9.

The cathode of the Zener diode 341 is connected to a terminal SP3 and one end of the current path of a phototransistor 342b of the photocoupler 342. The anode of the Zener diode 341 is connected to the other end of the current path of the phototransistor 342b and the main receiver 25.

The anode of a photodiode 342a is connected to the terminal SB of the secondary controller 37, and the cathode of the photodiode 342a is grounded.

When the secondary controller 37 sets the voltage signal of the terminal SB to a high level, a current flows in the photodiode 342a. Through this, the photodiode 342a emits light.

The phototransistor 342b becomes in a conducting state through the light from the photodiode 342a. Consequently, the signal current Is flows from the communication line L2, via secondary receiver 33, the terminal SP2, the terminal SP3, the phototransistor 342b, the terminal SP4 and the secondary protector 35, to the common line L3.

In addition, when the secondary controller 37 sets the voltage signal of the terminal SB to a low level, current stops flowing in the photodiode 342a. Accordingly, the phototransistor 342b turns off and the signal current Is is interrupted.

In this manner, it is possible for the secondary controller 37 to generate the signal current Is by controlling the voltage signal of the terminal SB.

In addition, when a large voltage is impressed on the communication circuit (the secondary receiver 33 and the secondary transmitter 34), such as when the commercial power source PS is erroneously connected between the communication line L2 and the common line L3, and/or the like, if the phototransistor 342b is in an interrupt state, excess voltage is impressed on the phototransistor 342b and the phototransistor 342b fails. In order to prevent this, protection for the phototransistor 242b to withstand voltage is realized by connecting the Zener diode 341 in parallel with the phototransistor 342b. In addition, besides this it would be fine to not use the Zener diode 341 but to use a phototransistor that can withstand a high collector voltage as the phototransistor 342b.

The secondary protector 35 shown in FIG. 7 protects the secondary receiver 33 and the secondary transmitter 34 from excess voltage or excess current when the commercial power source PS is erroneously connected to the communication line L2 and the common line L3.

Figure 10:
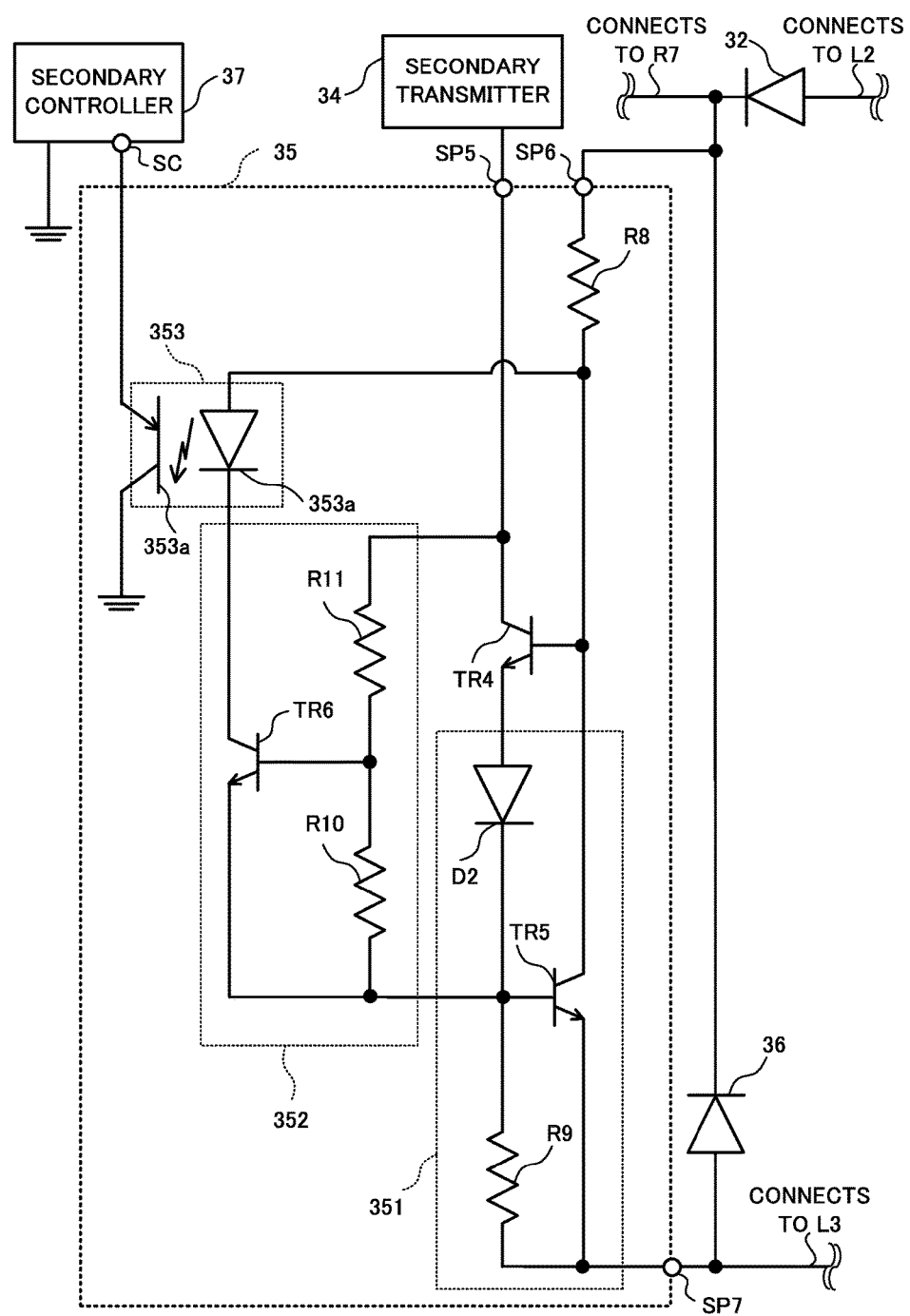
FIG. 10 is a circuit diagram of a secondary protector shown in FIG. 7.

The secondary protector 35 comprises a current-limiting controller 351, a load limiter 352, an erroneous connection detector 353 and a resistor R8, as shown in FIG. 10.

The current-limiting controller 351 is a device that limits the maximum value of the signal current Is flowing in the secondary receiver 33 and the secondary transmitter 34, and comprises an NPN transistor TR5, a rectifier diode D2 and a resistor R9.

In addition, an NPN transistor TR4 connected to the rectifier diode D2 is such that the emitter-collector path (the current path) is connected in series with the communication line L2.

One end of the resistor R9 and the emitter of the transistor TR5 are connected to the anode of the rectifier diode 36 and the common line L3 via the terminal SP7. The other end of the resistor R9 and the base of the transistor TR5 are connected to the cathode of the rectifier diode D2 and the load limiter 352.

The anode of the rectifier diode D2 is connected to the emitter of the transistor TR4. The collector of the transistor TR4 is connected to the secondary transmitter 34 via a terminal SP5. In addition, the collector of the transistor TR4 is connected to the load limiter 352.

The base of the transistor TR4 is connected to the collector of the transistor TR5, the erroneous connection detector 353 and one end of the resistor R8. The other end of the resistor R8 is connected to the cathode of the rectifier diode 32, one end of the resistor R7 and the cathode of the rectifier diode 36, via the terminal SP6.

When the commercial power source PS is connected between the power source line L1 and the common line L3 and the secondary transmitter 34 is in an on state, the signal current Is flows from the terminal SP5, via the emitter-collector path of the transistor TR4, the rectifier diode D2, the resistor R9 and the terminal SP7, to the common line L3. This state is the normal state.

When the signal current Is increases to equal to or greater than a set value by the commercial power source PS being erroneously connected between the communication line L2 and the common line L3, the transistor TR5 causes the collector-emitter voltage to change so that the end-to-end voltage of the resistor R9 maintains an equilibrium status with the on voltage of the transistor TR5 (around 0.6 volt). Through this, the transistor TR5 regulates the base-emitter voltage of the transistor TR4. In this manner, it is possible to limit the upper limit of the current Is flowing in the communication circuit (the secondary receiver 33 and the secondary transmitter 34), and it is possible to protect the communication circuit from eddy current.

While the above-described current-limiting controller 351 is limiting the upper limit of the signal current Is, the transistor TR4 is operating in the active region, so the collector-emitter voltage of the transistor TR4 becomes larger than the case of not operating in the saturation region (compared to when the upper limit of the signal current Is is not limited). In addition, collector dissipation equivalent to the integrated value of the collector-emitter voltage of the transistor TR4 and the collector current (signal current Is) of the transistor TR4 is generated in the transistor TR4. When a high voltage such as voltage supplied from the commercial power source PS is impressed between the communication line L2 and the common line L3, the collector dissipation generated in the transistor TR4 becomes extremely large. Consequently, an expensive product large in size, which can withstand high voltages and has high permitted collector dissipation, is sought for the transistor TR4.

In order to resolve this problem, the load limiter 352 is provided in the secondary protector 35. The load limiter 352 controls the collector dissipation of the transistor TR4 by turning the transistor TR4 off when the emitter-collector voltage of the transistor TR4 becomes equal to or greater than a set value.

In this exemplary embodiment, the load limiter 352 turned the transistor TR4 off when the emitter-collector voltage of the transistor TR4 becomes equal to or greater than a set value, but this is intended to be illustrative and not limiting, for it would be fine, for example, for the transistor TR4 to be turned off when the voltage between the terminal SP5 and the terminal SP7 becomes equal to or greater than a reference value, and when the emitter-collector voltage of the transistor TR4 becomes equal to or greater than a set value. In addition, the load limiter 352 may turn the transistor TR4 off when, for example, the voltage between the terminal SP1 and the terminal SP4 becomes equal to or greater than a reference value, and the emitter-collector voltage of the transistor TR4 becomes equal to or greater than a set value.

The load limiter 352 comprises an NPN transistor TR6 and resistors R10 and R11. The transistor TR6 controls the collector dissipation of the transistor TR4 by accomplishing excess voltage detection of the end-to-end voltage of the series resistance of the resistor R10 and the resistor R11.

One end of the resistor R10 is connected to the emitter of the transistor TR6, the other end of the resistor R9, the base of the transistor TR5 and the cathode of the rectifier diode D2.

The other end of the resistor R10 is connected to the base of the transistor TR6 and one end of the resistor R11. The other end of the resistor R11 is connected to the collector of the transistor TR4. In addition, the collector of the transistor TR6 is connected to the erroneous connection detector 353.

A voltage that is the sum of the forward voltage of the rectifier diode D2 and the collector-emitter voltage of the transistor TR4 is impressed on the series resistance of the resistor R10 and the resistor R11.

In this circuit, when the current-limiting controller 351 limits the upper limit of the signal current Is, the end-to-end voltage of the series resistance of the resistor R10 and the resistor R11 rises. Furthermore, when the end-to-end voltage of the resistor R10, which is a partial voltage of this end-to-end voltage, exceeds the on voltage (around 0.6 V) between the base and emitter of the transistor TR6, the transistor TR6 turns on and puts the emitter-collector thereof in a conducting state.

Through this, the base-emitter voltage of the transistor TR4 falls, the transistor TR4 becomes in an interrupt state and the collector current (the signal current Is) of the transistor TR4 is interrupted. Through this, the permitted collector dissipation of the transistor TR4 can be controlled in comparison to cases in which the load limiter 352 is not provided. Hence, it is possible to use an inexpensive transistor with low permitted collector dissipation as the transistor TR4.

The erroneous connection detector 353 detects the collector current of the transistor TR6 flowing when the end-to-end voltage of the series resistance of the resistor R10 and the resistor R11 is equal to or greater than a set value, and conveys a detection signal (a signal indicating that the commercial power source PS has been erroneously connected) to the secondary controller 37. Through this, the secondary controller 37 can be notified that excess voltage is impressed on the communication circuit (the secondary receiver 33 and the secondary transmitter 34) because of erroneous connection.

The erroneous connection detector 353 comprises a photocoupler comprising a photodiode 353a and a phototransistor 353b. The cathode of the photodiode 353a is connected to the collector of the transistor TR6, and the anode is connected to the base of the transistor TR4, the collector of the transistor TR5 and one end of the resistor R8.

On the other hand, the phototransistor 353b has one end of the current path connected to a terminal SC of the secondary controller 37 and the other end of the current path is grounded.

As described above, when the end-to-end voltage of the resistor R10 exceeds the on voltage between the base and the emitter of the transistor TR6, the emitter-collector of the transistor TR6 becomes conductive. At this time, the current flowing in the emitter-collector path of the transistor TR6 flows through the photodiode 353a and causes the photodiode 353a to light up.

Through this, the phototransistor 353b turns on and the emitter-collector path is caused to become conductive. Consequently, the terminal SC of the secondary controller 37 is grounded. Through this, the secondary controller 37 detects that the commercial power source PS was erroneously connected.

The secondary controller 37 comprises a processor and/or the like that operates through an operation power source supplied from the secondary control power source 31, and accomplishes control of the normal air conditioning operation of the secondary air conditioning unit 12. In addition, the secondary controller 37 accomplishes transmitting and receiving of serial signals using the signal current Is, to and from the main air conditioning unit 11.

In addition, the secondary controller 37 executes a control process on the basis of the detection signal of the erroneous connection detector 353. The secondary control 37 causes a lamp provided in the main air conditioning unit 12 to turn on, for example when the detection signal is received. Through this, an installer who installs the main air conditioning unit 12 can understand that the commercial power source PS is erroneously connected.

(Transmitting and Receiving Serial Signals)

Transmitting and receiving serial signals by the above-described main air conditioning unit 11 and secondary air conditioning units 12 will be described concretely. The main air conditioning unit 11 and the secondary air conditioning units 12 are connected to each other by the power source line L1, the communication line L2 and the common line L3, and when the commercial power source PS is connected between the power source line L1 and the common line L3, it is possible to send and receive serial signals.

When the main air conditioning unit 11 transmits a serial signal to the secondary air conditioning units 12, the main controller 28 outputs the serial signal being transmitted to the secondary air conditioning units 12 to the terminal TB.

At this time, the photodiode 242a emits light as a result of the main controller 28 outputting a high-level voltage to the terminal TB, so that the phototransistor 242b become conductive and the signal current Is flows.

On the other hand, when the main controller 28 impresses a low-level voltage on the terminal TB, the photodiode 242a does not emit light, the phototransistor 242b becomes off and the signal current Is does not flow. In this manner, the signal current Is in accordance with the serial signal output by the main controller 28 is conveyed to the secondary air conditioning units 12 via the communication line L2.

When the secondary air conditioning units 12 receive the serial signal transmitted from the main air conditioning unit 11, the secondary controller 37 shown in FIG. 7 continues to output a high-level voltage to the terminal SB so that the current signal Is flows from the communication line L2 to the common line L3 (so that the current signal Is can be received by the secondary receiver 33), and the phototransistor 342b continues to conduct.

In this state, when the signal current Is flows to the communication line L2, the signal current Is flows to the photodiode 331a of the secondary receiver 33. Hence, the secondary receiver 33 outputs a low-level reception signal to the secondary controller 37.

On the other hand, when the signal current Is does not flow to the communication line L2, the current signal Is does not flow to the photodiode 331a of the secondary receiver 33. Hence, the secondary receiver 33 outputs a high-level reception signal to the secondary controller 37.

As described above, the main air conditioning unit 11 transmits the serial signal to the secondary air conditioning units 12. In addition, the secondary air conditioning units 12 receive the serial signal from the main air conditioning unit 11.

When transmitting the serial signal to the secondary air conditioning units 12 from the main air conditioning unit 11 is completed, the main controller 28 outputs a serial signal indicating transmission completion to the terminal TB, and makes the main transmitter 24 transmit the transmission completion signal. Following this, the main controller 28 continues to output the high-level voltage to the terminal 1B and continues to cause the phototransistor 242b to conduct so that the terminal TP1 of the communication power source 22 that outputs the communication voltage and the communication line L2 are caused to be conducting (so that the current signal Is can be received by the main receiver 25).

On the other hand, upon receiving the transmission completion signal, the secondary controller 37 switches the high-level voltage continuing to be output to the secondary receiver 34 to low level. Following this, the secondary controller 37 outputs a serial signal to be transmitted to the main air conditioning unit 11 to the terminal SB.

At this time, the photodiode 342a emits light, the phototransistor 342b become conductive and the signal current Is flows by means of the secondary controller 37 outputting the high-level voltage to the terminal SB.

On the other hand, when the secondary controller 37 impresses the low-level voltage on the terminal TB, the photodiode 342a does not emit light, the phototransistor 342b turns off and the signal current Is does not flow. In this manner, the signal current Is in accordance with the serial signal output by the secondary controller 37 flows to the main air conditioning unit 11.

When the signal current Is flows to the main air conditioning unit 11, the signal current Is flows to the photodiode 251a of the main receiver 25. Hence, the main receiver 25 outputs a low-level reception signal to the main controller 28.

On the other hand, when the signal current Is does not flow to the main air conditioning unit 11, the signal current Is does not flow to the photodiode 251a of the main receiver 25. Hence, the main receiver 25 outputs a high-level reception signal to the main controller 28.

As described above, the secondary air conditioning unit 12 transmits a serial signal to the main air conditioning unit 11. In addition, the main air conditioning unit 11 receives the serial signal from the secondary air conditioning unit 12.

When transmission of the serial signal from the secondary air conditioning units 12 to the main air conditioning unit 11 is completed, the secondary controller 37 outputs a serial signal indicating transmission completion to the terminal SB, and makes the secondary receiver 34 transmit the transmission completion signal. Following this, the secondary controller 37 continues to output the high-level voltage to the terminal SB and keeps the phototransistor 342b in conducting state so that the current signal Is flows from the communication line L2 to the common line L3 (so that the current signal Is can be received by the secondary receiver 33).

(When the Commercial Power Source PS is Erroneously Connected)

The protection action of the secondary air conditioning units 12 and the protection action of the main air conditioning unit 11 when the commercial power source PS is erroneously connected between the communication line L2 and the common line L3 will be described.

When the electric potential of the communication line L2 is higher than the electric potential of the common line L3, the rectifier diode 26 of the main air conditioning unit 11 interrupts the current flowing from the communication line L2 toward the resistor R1. Through this, it is possible to prevent a reverse voltage from being impressed on the main protector 23, the main transmitter 24 and the main receiver 25.

In addition, when the electric potential of the communication line L2 is higher than the electric potential of the common line L3, a closed circuit is formed comprising the communication line L2, the rectifier diode 32, the resistor R7, the photodiode 331a of the secondary receiver 33, the Zener diode 341 of the secondary transmitter 34, the emitter-collector path of the transistor TR4 of the secondary protector 35, the rectifier diode D2, the resistor R9 and the common line L3.

When the signal current Is flowing in this closed circuit increases to equal to or greater than a set value, the transistor TR5 causes the collector-emitter voltage to change so that the end-to-end voltage of the resistor R9 maintains an equilibrium with the on voltage (around 0.6 V) of the transistor TR5. Through this, the transistor TR5 adjusts the base-emitter voltage of the transistor TR4. In this manner, the current-limiting controller 351 controls the upper limit of the current Is flowing in the communication circuit (the secondary receiver 33 and the secondary transmitter 34).

In addition, when the current-limiting controller 351 controls the signal current Is, the end-to-end voltage of the series resistance of the resistor R10 and the resistor R11 rises. In addition, when the end-to-end voltage of the resistor R10, which is a partial voltage of that end-to-end voltage, exceeds the on voltage (around 0.6 V) between the base and emitter of the transistor TR6, the load limiter 352 of the secondary protector 35 turns the transistor TR6 on and puts the emitter-collector in a conducting state.

Through this, the base-emitter voltage of the transistor TR4 falls, the transistor TR4 becomes in an interrupt state and the collector current (signal current Is) of the transistor TR4 is interrupted.

Control by the secondary controller 37 is not necessary for operation of the above-described secondary air conditioning units 12. Hence, even when an abnormality occurs in the secondary controller 37 and the secondary controller 37 is not operating correctly, the secondary protector 35 can protect the rectifier diode 32, the secondary receiver 33 and the secondary transmitter 34 from excess current.

In addition, because the secondary protector 35 is disposed within the closed circuit formed when the commercial power source PS is erroneously connected between the communication line L2 and the common line L3, it is possible to control excess current flowing in the closed circuit.

On the other hand, when the electric potential of the communication line L2 is lower than the electric potential of the common line L3, a closed circuit is formed comprising the common line L3, the Zener diode 222 of the communication power source 22, the resistor R3 of the main protector 23, the rectifier diode D2 thereof, the emitter-collector path of the transistor TR1 thereof, the Zener diode 241 of the main transmitter 24, the main receiver 25, the resistor R1, the rectifier diode 26 and the communication line L2.

When the signal current Is flowing in this closed circuit increases to equal to or greater than a set value, the transistor TR2 causes the collector-emitter voltage to change so that the end-to-end voltage of the resistor R3 maintains an equilibrium with the on voltage (around 0.6 V) of the transistor TR2. Through this, the transistor TR2 adjusts the base-emitter voltage of the transistor TR1. In this manner, the current-limiting controller 231 controls the upper limit of the current Is flowing in the communication circuit (main transmitter 24 and main receiver 25).

In addition, when the current-limiting controller 231 controls the signal current Is, the end-to-end voltage of the series resistance of the resistor R4 and the resistor R5 rises. In addition, when the end-to-end voltage of the resistor R4, which is a partial voltage of that end-to-end voltage, exceeds the on voltage (around 0.6 V) between the base and emitter of the transistor TR3, the load limiter 232 of the main protector 23 turns the transistor TR3 on and puts the emitter-collector thereof in a conducting state.

Through this, the base-emitter voltage of the transistor TR1 falls, the transistor TR1 becomes in an interrupt state and the collector current (signal current Is) of the transistor TR1 is interrupted As described above, with the main air conditioning unit 11 and the secondary air conditioning units 12 of this exemplary embodiment, current-limiting controllers 231 and 351 that limit the upper limit of the signal current Is flowing in the communication circuit (main transmitter 24 and main receiver 25, or secondary receiver 33 and secondary transmitter 34) are installed in the main air conditioning unit 11 and the secondary air conditioning units 12, and through this it is possible to protect the communication circuit from excess current that occurs when the commercial power source PS is erroneously connected.

In addition, the current-limiting controller 231 comprises the transistor TR2, so compared to a thermistor having a positive temperature coefficient it is possible to limit excess current quickly, and a more stable protection action is possible. Similarly, the current-limiting controller 351 comprises the transistor TR5, so compared to a thermistor having a positive temperature coefficient it is possible to limit excess current quickly, and a more stable protection action is possible.

In addition, when the load limiter 232 (352) detects equal to or greater than a set excess voltage, the transistor TR1 (TR4) forcibly turns to be in interrupt state and interrupt the signal current Is. Hence, it is possible to use an inexpensive transistor with low permitted collector dissipation as the transistor TR1 (TR4). In addition, circuit design realizing heat discharge at the transistor TR1 (TR4) is simple.

Regardless of the on/off state of the main transmitter 24 and the secondary transmitter 34, the main protector 23 and the secondary protector 35 protect the circuit components from excess voltage and excess current. Hence, regardless of the kind of serial signal the main controller 28 and the secondary controller 37 output to the main transmitter 24 and the secondary transmitter 34 through runaway software, the main protector 23 and the secondary protector 35 realize certain circuit protection.

In addition, because Zener diodes 241 and 341 are connected in parallel with the photocouplers 242 and 342 of the main transmitter 24 and the secondary transmitter 34 and transistors that can withstand high collector voltages are used for the transistors TR1 and TR4, it is possible to use products that withstand normal collector voltage for the photocouplers 242 and 342. In a conventional main air conditioning unit and secondary air conditioning unit that do not have the Zener diodes 241 and 341 or the transistor TR1 and TR4, photocouplers that can withstand high collector voltages were used. However, problems exist in that such photocouplers are expensive, the number of models manufactured is small and there are no models that can accomplish the high-speed switching necessary for accomplishing high-speed communication. In addition, if production of the photocoupler being utilized is for some reason suspended, it would be difficult to select a substitute product with equivalent performance. However, in the main air conditioning unit 11 and the secondary air conditioning units 12 of this exemplary embodiment, it is possible to use a photocoupler that can withstand normal collector voltage, making it possible to eliminate these problems.

Above, the exemplary embodiment of the present disclosure was described, but the present disclosure is not limited to the above-described exemplary embodiment, for various variations and applications are possible.

The above-described main protector 23 comprises a PNP transistor, but this is intended to be illustrative and not limiting. The main protector 23 that realizes the above-described logic may comprise an NPN transistor.

In addition, the above-described secondary protector 35 comprises an NPN transistor, but this is intended to be illustrative and not limiting. The secondary protector 35 that realizes the above-described logic may comprise a PNP transistor.

In addition, the transistor TR1 of the main protector 23 is a single element but may comprise two or more elements. For example, when the transistor TR1 of the main protector 23 comprises two elements, the emitter of the first element is connected to the cathode of the rectifier diode D1 and the collector of the first element is connected to the emitter of the second element. In addition, the base of the first element and the base of the second element are connected to one end of the resistor R6. In addition, the collector of the second element may be connected to the terminal TP3 and the load limiter 232. In a similar way, the transistor TR4 of the secondary protector 35 may comprise two or more elements.

The above-described main protector 23 and secondary protector 35 comprise bipolar transistors, but this is intended to be illustrative and not limiting. That is to say, the main protector 23 and the secondary protector 35 may comprise field effect transistors.

Figure 11:
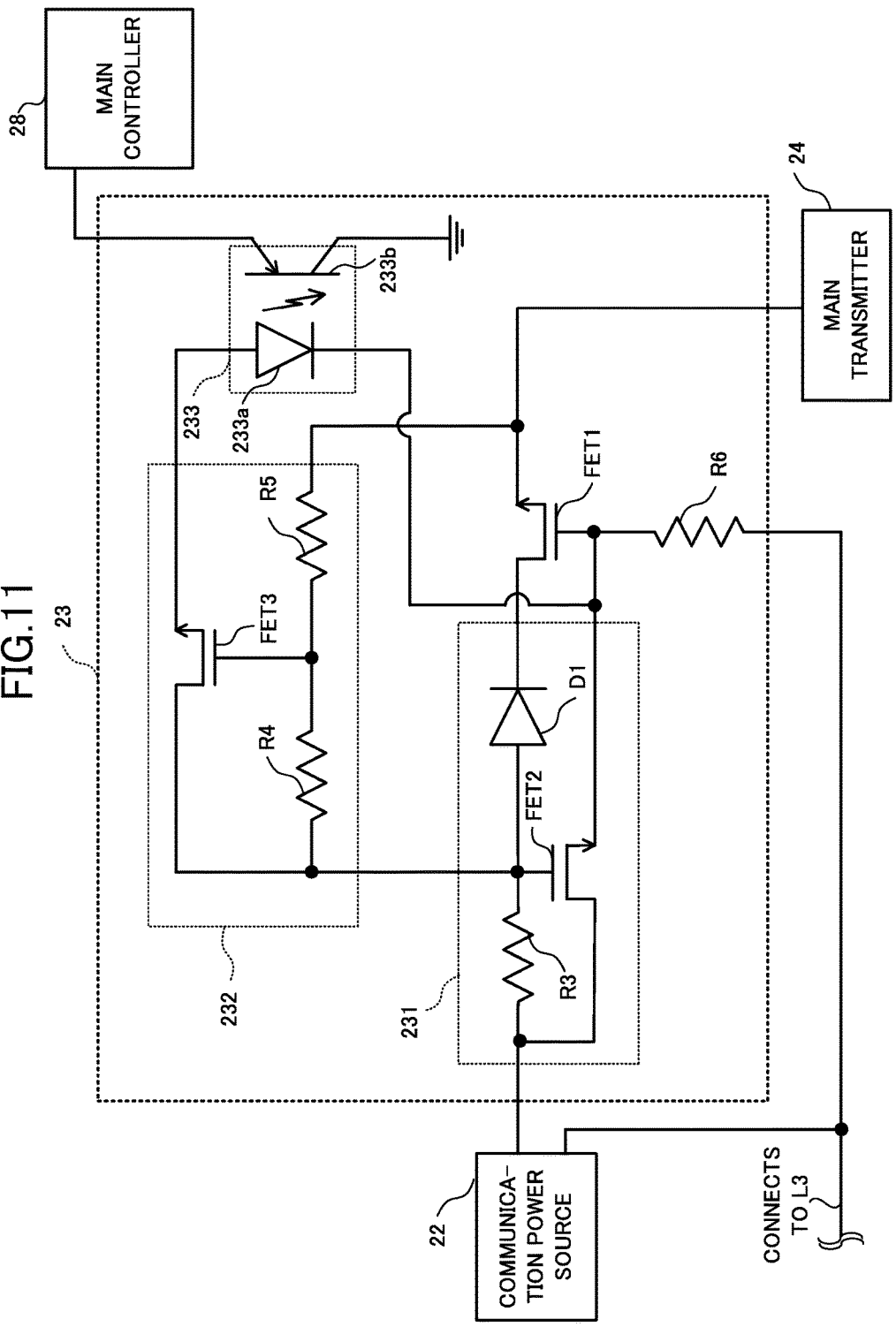
FIG. 11 is a circuit diagram for a case in which the main protector shown in FIG. 2 comprises a field effect transistor.

When the main protector 23 comprises a field effect transistor, the PNP transistors TR2 to TR3 are replaced with N-type field effect transistors FET1 to FET3, as shown in FIG. 11. In addition, the gate of the field effect transistor FET1 is connected to the other end of the resistor R3, the anode of the rectifier diode D1 and the load limiter 232. The source of the field effect transistor FET1 is connected to one end of the resistor R3. The drain of the field effect transistor FET1 is connected to the erroneous connection detector 233, one end of the resistor R6 and the gate of the field effect transistor FET2.

In addition, the source of the field effect transistor FET2 is connected to the cathode of the rectifier diode D1. The drain of the field effect transistor FET2 is connected to the load limiter 232 and the terminal TP3.

In addition, the gate of the field effect transistor FET3 is connected to the other end of the resistor R4 and one end of the resistor R5. The source of the field effect transistor FET3 is connected to one end of the resistor R4, the other end of the resistor R3, the anode of the rectifier diode D1 and the gate of the field effect transistor FET1. The drain of the field effect transistor FET3 may be connected to the anode of the photodiode 232a.

The apparatus operates as follows in the case of the above-described composition. When the commercial power source PS is connected between the power source line L1 and the common line L3, the communication voltage is output from the terminal TP2 of the communication power source 22. In this state, when the main transmitter 24 causes the signal current Is to flow, the signal current Is flows from the communication power source 22, via the terminal TP2, the resistor R3, the rectifier diode D1, the source-drain path of the field effect transistor FET1 and the terminal TP3, to the main transmitter 24. This state is the normal state.

On the other hand, when the signal current Is increases due to some factor or other (for example, when the commercial power source PS is erroneously connected between the communication line L2 and the common line L3), the voltage drop across the resistor R3 increases accompanying the increase in current. At this time, the field effect transistor FET2 causes the drain-source voltage of the field effect transistor FET2 to change so that the end-to-end voltage of the resistor R3 maintains an equilibrium with the on-voltage of the gate-source voltage of the field effect transistor FET2, and the gate-source voltage of the field effect transistor FET2 is regulated. Consequently, it is possible to limit the upper limit of the current Is flowing to the main transmitter 24.

In addition, when the current-limiting controller 231 limits the upper limit of the signal current Is, the end-to-end voltage of the series resistance of the resistor R4 and the resistor R5 rises. In addition, the end-to-end voltage of the resistor R4, which is a partial voltage of that end-to-end voltage, exceeds the on voltage (around 0.6 V) of the source-drain of the field effect transistor FET3, the load limiter 232 turns the field effect transistor FET3 on and puts the source-drain thereof in a conducting state.

Through this, the gate-source voltage of the field effect transistor FET1 falls, the field effect transistor FET1 enters an interrupt state and the drain current (signal current Is) of the field effect transistor FET1 is interrupted.

In a similar manner, the secondary protector 35 may comprise field effect transistors.

In addition, the main protector 23 is placed between the communication power source 22 and the main communicator 24, but this is intended to be illustrative and not limiting. The placement position of the main protector 23 may, for example, be between the main transmitter 23 and the main receiver 24, between the main receiver 25 and the resistor R1, and/or the like.

Similarly, the secondary protector 35 is placed between the secondary transmitter 34 and the common line L3, but this is intended to be illustrative and not limiting. The placement position of the secondary protector 35 may, for example, be between the resistor R7 and the secondary receiver 33, between the secondary receiver 33 and the secondary transmitter 34, and/or the like.

In addition, in the phototransistor 242b of the main transmitter 24 and the phototransistor 342b of the secondary transmitter, Zener diodes 241 and 341 that limit the voltage impressed on the phototransistors 242b and 342b are connected in parallel with the current path of the phototransistors 242b and 342b, but this is intended to be illustrative and not limiting. In the phototransistor 242b of the main transmitter 24 and the phototransistor 342b of the secondary transmitter, it is possible to limit the voltage impressed on the phototransistors 242b and 342b with other than Zener diodes. For example, fixed voltage circuits may be connected in parallel with the current paths of the phototransistors 242b and 342b.

In addition, the main air conditioning unit 11 was for example an outdoor unit and the secondary air conditioning units 12 were for example indoor units, but this is intended to be illustrative and not limiting. The main air conditioning unit 11 may for example be an air conditioning controller and the secondary air conditioning units 12 may for example be fans controlled by the air conditioning controller. In this manner, the combination of the main air conditioning unit 11 and the secondary air conditioning units 12 is not limited.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A protection device for an air conditioning system, the air conditioning system including air conditioning units connected to each other by connection lines including a communication line, a power source line and a common line, the protection device comprising:
    a first transistor including a first current path connected in series with the communication line; and
    a current-limiting controller configured to limit an electric current flowing in the first current path by controlling the first transistor so that a resistance value of the first current path increases, when the electric current flowing in the first current path is equal to or greater than a set electric current; and
    a current interrupt controller configured to turn off the first transistor when an end-to-end voltage of the first current path is equal to or greater than a set voltage while the first transistor is operating in an active region, wherein
    the protection device is configured to prevent an excess electric current from flowing in the communication line.

2. The protection device according to claim 1, wherein the protection device is installed in a main air conditioning unit and one of secondary air conditioning units.

3. The protection device according to claim 1, wherein the current interrupt controller comprises a second transistor configured to cause a voltage impressed between first control terminals configured to control the resistance value to fall so that the first transistor is turned off, by turning on when a voltage corresponding to the end-to-end voltage is impressed and the end-to-end voltage becomes equal to or greater than the set voltage.

4. The protection device according to claim 3, wherein the second transistor includes a second current path having one end connected to one end of the first current path and having the other end connected to one of the first control terminals, the second transistor configured to cause the voltage impressed between the first control terminals to fall so that the first transistor is turned off by turning on when the voltage corresponding to the end-to-end voltage is impressed between second control terminals configured to control the second transistor, and the voltage generated between the one end and the other end of the first current path becomes equal to or greater than the set voltage.

5. The protection device according to claim 4, wherein the current-limiting controller comprises a third transistor configured to cause the voltage impressed between the first control terminals to fall so that the resistance value is increased, by turning on when a voltage corresponding to the electric current flowing in the first current path is impressed and the electric current flowing in the first current path becomes equal to or greater than the set electric current.

6. The protection device according to claim 5, wherein:
    the current-limiting controller comprises a resistor configured to impress the voltage corresponding to the electric current flowing in the first current path between third control terminals configured to control the third transistor; and
    the third transistor causes the voltage impressed between the first control terminals to fall and causes the resistance value to increase, by turning on when the electric current flowing in the first current path becomes equal to or greater than the set electric current.

7. The protection device according to claim 6, further comprising a first photocoupler configured to cause a first phototransistor to output a signal, by a signal electric current that flows when the second transistor turns on being conducted to a first photodiode.

8. The protection device according to claim 7, further comprising:
    a second photocoupler including a second photodiode through which an electric current flows in accordance with an outside signal from an outside, and a second phototransistor including a fourth current path that is turned on by light emitted from the second photodiode and is connected in series with the communication line; and
    a voltage limiter connected in parallel with the fourth current path and configured to limit the voltage impressed on the fourth current path.

9. The protection device according to claim 8, wherein the protection device is placed in a closed circuit formed when a power source is connected to the communication line.

10. A protection method for a protection device for an air conditioning system, the air conditioning system including air conditioning units connected to each other by connection lines including a communication line, a power source line and a common line, the protection method comprising:
    limiting an electric current flowing in a current path of a first transistor, the current path being connected in series with the communication line, by controlling the first transistor so that a resistance value of the current path increases, when the electric current flowing in the current path is equal to or greater than a set electric current; and
    turning off the first transistor when an end-to-end voltage of the current path is equal to or greater than a set voltage while the first transistor is operating in an active region, wherein
    the protection method prevents an excess electric current from flowing in the communication line.

* * * * *